3,319,646
CONTROL APPARATUS
Roman Smulka, Minneapolis, Minn., assignor to Honeywell Inc., a corporation of Delaware
Filed Dec. 24, 1964, Ser. No. 421,065
10 Claims. (Cl. 137—269)

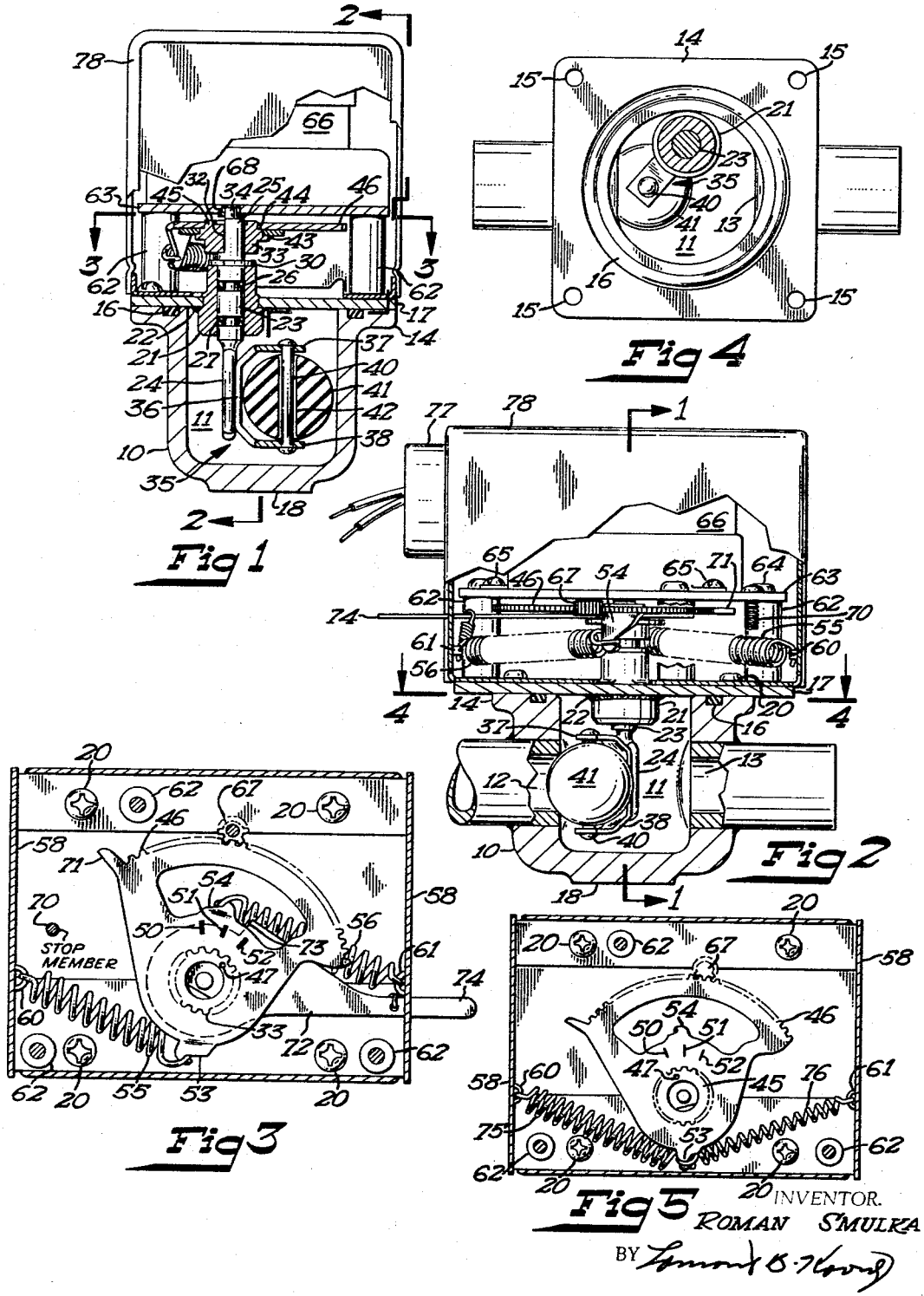

This invention relates to control apparatus and more specifically to control valves. While not limited thereto, my invention finds particular application in relatively small motor operated valves which are especially useful for controlling the flow of water in heating or cooling systems.

Valves of this type should generally be relatively small and inexpensive but reliable and capable of continuous operation over long periods of time without requiring service. Further, they should provide a good fluid tight seal when in the closed position. Various applications may require different forms of the control valve. For example, while many installations require a two-way, normally closed valve, other installations call for a normally open version of the same valve. Likewise, many applications require a valve which closes against the pressure of the fluid being controlled but, in some applications, a similar valve which closes with the fluid pressure is more desirable. In addition, many applications require a three-way or diverting valve.

My invention provides a valve which I choose to refer to as a universal valve in that it is readily convertible to meet the requirements in each of the various situations enumerated above. It is of the type having an actuator including a motor adapted, when energized, to drive the valve closure member in one angular direction and spring biasing means urging the closure member in the other angular direction. With a single valve body and actuator, my valve is readily convertible from a two-way normally closed to a two-way normally open valve and is readily convertible from one which closes with fluid pressure to one which closes against the pressure. By simply providing an additional port in the same valve body and by a simple manipulation of the actuator components, the valve is readily convertible for three-way operation as a diverting valve. This universal feature is accomplished by the provision of a symmetrical valve body and an actuator therefor and means for mounting the actuator on the body in either of two diametrically opposed angular positions to facilitate reversal of the operations of the valve. This renders the valve capable of being selectively assembled to give closure either with or against pressure. The actuator includes a construction whereby the operative relationship between the valve actuator and the valve closure member is such so that, by a simple manipulation of parts in the actuator, this relationship can be changed to provide normally closed, normally open or three-way operation of the valve.

I have further provided a symmetrical valve closure member and a means for mounting it so that the closure member has limited axial and transverse movement with respect to the mounting to render it substantially self-seating when brought into engagement with a cooperating valve seat but which is supported so that it provides a substantially uniform seating pressure along the line of engagement between the closure member and the cooperating seat. Preferably this valve closure member is spherical in shape and symmetrical about its mounting. It is freely rotatable thereabout so that impingement on the closure member by the fluid being conveyed, particularly during the opening and closing of the valve, causes the closure member to rotate about its mounting and thereby to present a different sealing surface to the valve seat each time that the valve is closed and to reduce the amount of wear on the closure member.

Various objects and advantages of my invention will become apparent upon reading the following description of my invention in conjunction with the accompanying drawing wherein:

FIGURE 1 is a transverse cross-sectional view taken generally through the center of a valve and actuator constructed according to my invention and generally along line 1—1 in FIGURE 2 but with the closure member moved to an open position.

FIGURE 2 is a longitudinal cross-sectional view of the valve and actuator taken generally along line 2—2 of FIGURE 1 but with the closure member moved to a closed position.

FIGURE 3 is a somewhat enlarged view disclosing a portion of the valve actuator taken generally along line 3—3 in FIGURE 1 and rotated 90° in a counterclockwise direction.

FIGURE 4 is a top view of the valve body with the actuator broken away and taken generally along line 4—4 of FIGURE 2.

FIGURE 5 is a view similar to FIGURE 3 but disclosing a modification to the actuator for the valve.

Referring to the drawing, reference numeral 10 generally designates a valve body which has a plurality of walls enclosing a cavity 11. Body 10 has an inlet port 12 and an outlet port 13 extending through opposite walls thereof and connecting into the cavity 11. The ports 12 and 13 are positioned so that they are generally aligned on opposite sides of the valve body. Ports 12 and 13 are preferably fitted with members 12a and 13a, respectively, which are soldered to the body. Members 12a and 13a act as valve seats in the cavity and may be chosen so as to provide any desired fitting for connecting the valve into a fluid line. For example, without changing the valve body, members 12a and 13a may be provided for flare, threaded or sweated connections. As disclosed, the valve body provides for two-way operation but it is to be understood that the valve body is so designed that an additional port can be readily provided therein to render the valve applicable for three-way or diverting operation. For example, the bottom wall 18 of the valve body may be apertured to provide a third port or one of the two side walls (other than the two containing ports 12 and 13) may be apertured to provide such a port. Also, a two-way "angle valve" can be provided by plugging one of the ports 12 and 13 and adding an additional port in the wall 18 or in one of the two side walls. As best seen in FIGURE 4, the cavity 11 is symmetrical and may be generally rounded in shape and, if desired, the wall portions adjacent the ports 12 and 13 may be somewhat flattened.

At the top of the body 10 is provided a generally square flange portion 14 which has a threaded aperture 15 adjacent each of its four corners. Concentric with the cavity 11, flange portion 14 has formed therein an annular groove in which is mounted an O-ring 16 which is compressed and provides a fluid tight seal when a cover plate 17 is mounted on the valve body. Cover plate 17 is attached to the valve body by appropriate means such as screws 20 which extend through the cover plate and are threaded into the openings 15 in the flange portion 14 of the valve body. As will be seen hereinafter, the cover plate and valve body are constructed, and the mounting with screws 20 and apertures 15 are so arranged, that the cover plate can be mounted in either of two diametrically opposed angular positions on the valve body.

Cover plate 17 has formed therein an aperture through which extends a bearing member 21 which itself has an axially extending cylindrical opening therethrough. The bearing member may be attached to the cover plate by any appropriate means but it is essential that a fluid tight seal be provided between the bearing member and the cover plate. In my preferred embodiment I have chosen to form the bearing with an enlarged annular shoulder which abuts the underside of the cover plate. On the top side of the cover plate the bearing member is staked over to hold it in place. To provide a fluid tight seal between the bearing and the plate, I have chosen to solder the shoulder to the under portion of the plate as at 22 in FIGURE 1.

Rotatably mounted in the opening in bearing 21 is an operating stem 23. Stem 23 has a flatted end portion 24 disposed within the cavity 11 and an outer end 25 which extends upward of the outer end of bearing 21. It is essential that a fluid tight seal be provided between the operating stem and the bearing and, while any appropriate seal can be used, I have chosen to use a pair of O-rings 26 and 27 mounted in a pair of annular grooves in the stem, at a position which is disposed within the bearing 21. These O-rings not only provide a good fluid seal but allow the stem to be readily rotatable with respect to the bearing and the cover plate 17. Adjacent the upper end of bearing 21, stem 23 has formed therein another annular groove in which is mounted a snap ring 30 which limits the downward movement of the stem with respect to the bearing. The upper end portion 25 of the stem is formed with a flatted portion 32 on which is mounted a connector member 33 which has a mating aperture formed centrally therein so that when the connector member is mounted on the stem the two members fit tightly together and are non-rotatable with respect to each other. Stem 23 may also have, at its uppermost end, a portion 34 which co-acts with a support to be described hereinafter. Portion 34 is small enough in diameter so that the connector member 33 can be slid on over it.

The flatted end portion 24 of the operator stem has rigidly mounted thereon, by appropriate means (not shown) in the cavity 11, a U-shaped yoke member which has a bight portion 36 attached to the operator stem and a pair of spaced parallel legs 37 and 38 extending generally radially from the operator stem. Extending between legs 37 and 38, adjacent their free ends, is a mounting pin 40 which is secured to the legs in any appropriate manner, for example by crimping the ends of the pin once it is placed through an aperture in each leg. Mounted on pin 40 is a spherical valve closure member which has a cylindrical opening 42 extending diametrically therethrough. The valve closure member is mounted between legs 37 and 38 with pin 40 extending through this cylindrical opening. The closure member has a diameter which is somewhat less than the distance between the legs 37 and 38 to facilitate limited axial movement of the closure member with respect to the yoke. Also, the cylindrical opening 42 in the closure member is somewhat greater in diameter than the size of the pin 41 which extends therethrough to facilitate some limited transverse movement of the closure member with respect to the pin and yoke. This limited transverse and axial movement of the closure member with respect to its mounting renders the closure member substantially self-seating when it is brought into engagement with a mating valve seat or port. By so doing, the need for adjustment of the valve seats, to make sure that the closure member will mate properly with them, is unnecessary.

Additional flexibility of the closure member can be provided by rendering the pin 40 loosely held in the yoke member 35. This will facilitate even greater freedom of movement for the closure member. I have found that by utilizing the mounting arrangement shown and described, with the pin on which the closure member is mounted supported at both its upper and lower ends, a substantially uniform seating pressure is applied along the line of engagement between the closure member and the valve seat. In addition, the closure member is freely rotatable about the pin on which it is mounted and I have found that when this valve is utilized to control the flow of water through a conventional zone controlled system, the impingement of the water upon the closure member during opening and closing of the valve causes rotation of the closure member. As a consequence, each time the valve is moved to a closed position a new surface thereon is presented to the valve seat and hence, over a period of time, the wear on the valve closure member which naturally results from its mating with the valve seat, is substantially uniform and a much longer life for the closure member results. In my preferred embodiment I have chosen a closure member made of a rubber material so that it is somewhat deformable to improve its seating qualities but it is to be understood that I do not intend to be limited to the use of rubber. In some instances it may be desirable to use other materials such as plastics or various metals for example.

One further advantage which I have found in utilizing the above described closure member and mounting therefor is that, with the pin 40 extending parallel to the operating stem 23, the valve closure member simply rolls into engagement with the valve seat and this results in ease of operation as well as better seating and increased life of the closure member.

Connector member 33, which has previously been described as mounted on the upper end of operating stem 23, includes, from bottom to top, a pair of stepped annular flanges 43 and 44. Connector member 33 also has an upper portion 45 which is formed with a concentric geometrical shape and in my preferred embodiment I have chosen to form this member as an external gear.

Mounted on the connector member 33 is a gear sector 46 which has, concentric about its center of curvature, an opening which is symmetrical in shape and which mates with the portion 45 of the connector member. In my preferred embodiment this opening thus takes the form of an internal gear. Gear sector 46 is mounted on the connector member with the opening therein mating with the portion 45 of connector 33 and with the under surface of the gear sector engaging the upper surface of flange 44 on the connector member. By providing the mating concentric geometric configurations for portion 45 of the connector member and for the aperture in the gear sector, these members are rendered capable of being assembled in a plurality of relative angular positions but, when the two members are assembled together, relative rotation between them is precluded. On its top surface connector member 33 has an indicating mark 47 which is preferably located so that it lies in a vertical plane through the center of operator stem 23 and through the yoke 35 which supports the closure member. Hence by observing the position of the mark 47, which in my preferred embodiment simply takes the form of an indented circle on the surface of the connector, it is possible to tell the angular position of the closure member in the cavity. Gear sector 46 preferably has three indicia marks 50, 51 and 52 thereon to indicate the angular position between the connector member 33 and the gear sector. As will be seen hereinafter, different operating characteristics are obtained from the valve by assembling the connector member and gear sector so that different ones of these marks align with the mark 47 on the connector member. As will be pointed out subsequently, this arrangement forms an important aspect of my invention in that it facilitates the conversion of the valve from normally open to normally closed and from two-way to three-way diverting operation.

Sector 46 further includes a pair of diametrically opposed downwardly struck hooks 53 and 54 which are located equidistant from the center of rotation of the sector. Each of these hooks is adapted to be connected to one end of a biasing spring which urges the sector, and consequently the valve closure member, in one angular direction. In my preferred embodiment I provide a pair of substantially equal springs 55 and 56 which are connected to hooks 53 and 54 respectively. The other end of springs 55 and 56 are connected to a stationary surface such as to a frame member 58 which extends upward on each side of the actuator to provide a housing therefor. In my preferred embodiment, the springs 55 and 56 are connected to inwardly struck hook retainers 60 and 61 on opposite sides of the actuator. As noted above, the springs 55 and 56 are substantially equal and, since they extend in opposite directions from opposite sides of the sector member, they co-act to bias the sector member in a clockwise direction (as seen for example in FIGURE 3). Obviously, other spring biasing arrangements such as a torsion spring or a single spiral spring may be used. However I have found that it is preferable to use these two oppositely extending springs since they reduce the amount of thust upon the stem 23 and upon the O-rings 26 and 27.

Spaced upward from cover plate 17 by appropriate means such as pillars 62, is a motor mounting plate 63. The mounting plate 63 may be connected to the cover plate 17 by appropriate means such as screws 64 extending down through the pillars and threaded into apertures in the cover plate. Mounted on plate 63 by appropriate means such as screws 65 is an electric motor 66 which preferably is of the small uni-directional synchronous type and which includes a reduction gear train within its own housing. The motor together with this gear train may be referred to as an electric motor means. Motor 66 has an ouput pinion 67 extending downward from the underside thereof and when the motor is mounted on the assembly as described above, pinion 67 meshes with the teeth in gear sector 46. Motor 66 is adapted to drive the gear sector in a counterclockwise direction in opposition to the bias of springs 55 and 56. It should also be noted that motor 66 is preferably of the type which can be stalled for indefinite periods without causing any damage thereto. Motor mounting plate 63 may also have mounted thereon a bearing 68 in which portion 34 of the stem is journaled.

As disclosed in FIGURES 1 through 4, the valve is utilized as a normally closed valve with the springs 55 and 56 urging the closure member into engagement with inlet port 12 against the pressure of the fluid being conveyed. To accomplish this, the indicia mark 47 on the connector member 33 is aligned with indicia mark 52 on the gear sector when these two members are assembled. Thus indicia mark 52 may be referred to as the "normally closed" sector indicia. In this condition, the clockwise movement (as seen in FIGURE 3) of the sector, the stem and the closure member are limited by the engagement of the closure member with the port 12. When the motor 66 is energized, it drives the sector and thereby the stem and the closure member, to an open position wherein the closure member is disposed intermediate ports 12 and 13. This position is determined by a stop member preferably depending from the motor mounting plate 63 and adapted to operably engage sector 46 when it reaches a position corresponding to the desired open position of the valve closure member. This can be accomplished by simply having a downwardly struck portion on the plate 63 which will engage the sector when it reaches this position or it may take the form of a screw such as a screw 70 (see FIGURE 3) which is threaded through the plate 63 and adapted to engage an abutment portion 71 on the sector when it reaches the valve open position.

When the sector engages the stop, the motor stalls but remains energized to hold it in this position. When the motor is de-energized the springs 55 and 56 again return the closure member to engagement with valve port 12. If it is desired to convert the valve to a normally closed valve which closes with the fluid pressure, it is only necessary to rotate the cover plate 17, and thereby the actuator assembly, with respect to the valve body. This rotation of the cover plate and actuator through 180° allows it to be attached to the valve body by the use of the same screws 20 and apertures 15 which were used in the previous angular position of the actuator and cover plate. With the cover plate and actuator mounted in this position, the operating stem is disposed on the opposite side of a line through the axis of the ports 12 and 13 and again equidistant between the two ports. With the actuator mounted in this position, the springs 55 and 56 urge the closure member into engagement with outlet port 13 and when the motor is energized, it again drives the valve to an open position where the gear sector 46 intersects the stop 70.

The valve may also be provided with a manual opener which takes the form of a lever member 72 which is rotatably mounted upon the connector member 33 with its lower surface engaging the flange 43 and with an aperture through which the flange 44 of the connector member extends. Manual opener 72 includes a radially extending abutment portion 73 which is adapted, when the manual opener is rotated in a clockwise direction, (as seen in FIGURE 3), to engage the rear portion of hook 54 of the sector. Thus by rotating the manual opener in a counterclockwise direction, the sector and consequently the valve closure member can be manually moved. The manual opener includes handle portion 74 which extends through an aperture (not shown) in an end wall of the housing member 58 which surrounds the actuator. The handle portion 74 is confined in this aperture and the angular movement of the manual operator is preferably limited by the length of the aperture to rotation through an angle of approximately 45°.

The valve is also readily convertible for operation as a normally open valve. This is accomplished by changing the angular relationship of connector member 33 and sector 46 so that the indicia mark 47 on the connector aligns with indicia mark 50 on the sector. This results in relative rotation of the operating stem and the closure member in a counterclockwise direction with respect to the sector It is also necessary to remove the stop which was described in connection with the valve when utilized as a normally closed valve as described above. If the screw 70 is used as an abutment member it is only necessary to remove from the motor mounting plate 63. However, if a downwardly struck abutment is actually formed as a part of the plate 63, it is necessary to provide a plate which is similar but which does not have the downwardly struck abutment portion. With the stop 70 removed and with the connector member 33 and sector 46 assembled so that indicia 47 and 50 are aligned, springs 55 and 56 again urge the sector in a clockwise direction but this movement is limited by the abutment of the rear portion of hook 54 with the abutment portion 73 of the manual opener which, as noted above, is limited in its clockwise rotation by the length of the slot through which it extends. Thus the abutment portion 73 on the manual opener acts as a stop for the sector when the sector is in a position so that the valve closure member is disposed intermediate the two ports 12 and 13. With the cover plate and actuator mounted in the angular position disclosed in the drawing, energization of the motor drives the sector in a counterclockwise direction to bring the closure member into engagement with outlet port 13. When the closure member engages the outlet port, the motor stalls and maintains the valve in closed position until it is de-energized. At that time the springs return the valve to an open position where hook 54 abuts the abutment portion 73 of the manual opener. It will be seen that with this configuration the valve closes with the pressure of a fluid being conveyed. In order to render the valve normally open but with closure against the pressure, it is only necessary to rotate the actuator and the cover plate to its diametrically opposed angular position on the valve body. When so mounted the closure member is normally disposed intermediate the two valve seats but when the motor is energized it drives the closure member into engagement with inlet port 12.

As noted previously herein, the valve body is designed so that it can be readily provided with an additional port to render it usable for three-way or diverting operation. The actuator is also readily convertible for use in this manner. In order to do so, the stop 70 is again removed as it was when the actuator was used to provide normally open operation. The sector is rotated with respect to the connector 33 until the indicia marks 47 and 51 are aligned. As noted, indicia mark 51 is intermediate indicia 50 and 52 on the sector. With the connector member and gear sector assembled with this angular relationship, the abutment portion 73 of the manual opener will not interfere with hook 54 since clockwise rotation of the sector by the springs 55 and 56 will result in seating of the closure member on port 12 before the hook 54 engages the abutment surface 73. When the motor is energized it drives the sector, and consequently the valve closure member, through an arc to a closed position wherein the closure member engages outlet port 13. If, for some reason, it is desired that the springs normally close the valve on port 13 and the motor be operable to drive it into engagement with port 12, it is again only necessary to rotate the cover plate 17, and thereby the actuator, to its alternate angular position on the valve body.

FIGURE 5 discloses a modification to my valve actuator which may, in some instances, be desirable to utilize when the valve is to be used for normally open operation. I have found that when the springs return the sector, and consequently the closure member, to a position defined by the abutment of two members such as hook 54 and abutment portion 73 of the manual opener, the abrupt stopping of the movement of the sector results in a relatively substantial shock on the actuator components. This is due to the fact that the springs not only drive the sector and the valve closure member but also must rotate the motor in a reverse direction. Consequently a rather substantial amount of momentum is developed during such movement. If a relatively lightweight gear sector and pinion are to be used it has been found that this shock may result in damage to the teeth on the sector and pinion. This problem does not occur when the springs cause the closure member to seat against one of the valve ports since the closure member itself then absorbs a substantial part of the shock. It will be noted that this is not the case when the valve is used for normally open operation. To avoid these problems, I have found that the alternate arrangement disclosed in FIGURE 5 can be used to thereby render lighter weight sectors and pinions usable in such valves.

In this modification I remove the springs 55 and 56 which were previously used and substitute for them springs 75 and 76, each of which has one end connected to the hook 53 on the sector. Spring 75 is substantially stronger than spring 76 and is connected to a wall of the member 58 so as to urge the sector in a clockwise direction. Spring 76 is connected in opposing relationship with spring 75 and is connected to the opposite wall of the enclosure member 58. With this configuration, when motor 66 drives the sector in a counterclockwise direction to seat the closure member, spring 75 is stressed while spring 76 is substantially relaxed. When the motor is de-energized, spring 75 is effective to rotate the sector in a clockwise direction and to begin to stress spring 76. However, the springs are so chosen that they will just balance each other at an open position of the valve, that is, intermediate the ports 12 and 13. With this arrangement there is no shock on the actuator components as there would be if a solid stop were used.

In some applications it may also be desirable to substitute different biasing springs when the actuator is converted from two-way to three-way operation. This may be done, for example, to utilize springs having a different spring constant to compensate for the greater amount of deflection encountered in three way operation.

The enclosure member 58 for the actuator has been mentioned previously and, as seen in the drawing, is a generally U-shaped member which has its bight portion attached to the cover plate 17 by an appropriate means (not shown). The leg portions of this member extend upward at each end of the actuator and one of these leg portions may have a conduit connector 77 attached thereto. Cooperating with the enclosure member 58 there may also be provided an additional closure member 78 which may be slid vertically down over the upwardly extending portions of member 58 to completely enclose the actuator. Such an actuator enclosure is obviously desirable but has not been described in detail since it forms no part of the present invention.

In the foregoing description I have referred to a single preferred embodiment of my invention and one modification thereof. Various modifications may become apparent to those skilled in the art upon reading the foregoing description. Therefore, I do not intend to be limited to the specific embodiment described herein but intend that my invention should be limited solely by the scope of the appended claims.

I claim:
1. A fluid flow control valve comprising: a valve body having a fluid flow passage extending therethrough and a valve seat in said passage; an operating stem extending from the exterior of said body into said passage and being rotatable with respect to said body; means providing a fluid-tight seal between said stem and said body; a substantially U-shaped yoke member having a pair of spaced leg portions; a spherical valve closure member cooperable with said valve seat to control fluid flow through said passage, said closure member having a generally cylindrical opening extending diametrically therethrough; a generally cylindrical pin extending through the opening in said closure member and affixed at either side of said closure member to the free ends of said leg portions and thereby mounting said closure member between the leg portions of said yoke member, the cylindrical opening through said closure member having a diameter sufficiently greater than the diameter of said pin to permit limited transverse movement therebetween and to render said closure member freely rotatable about said pin by the fluid being conveyed by the valve, particularly during opening and closing thereof, and the distance between said leg portions being sufficiently greater than the diameter of said closure member to permit limited axial movement of said closure member on said pin, the limited axial and transverse movement of said closure member with respect to said pin and yoke member rendering said closure member self-seating when said closure member is moved into engagement with the valve seat; means rigidly attaching said yoke member to said operating stem with said leg portions extending generally radially from said stem and said pin generally parallel to said stem so that in a first angular position of said stem said closure member engages said seat and in a second angular position said closure member is removed therefrom to open said seat; motor means of the type which can be stalled without injury thereto mounted on said body; means operably connecting said motor means to said operating stem, said motor means being selectively energizable to drive said stem to one of said angular positions and to stall in that position so long as said motor means is energized; and spring means urging said stem to the other of said angular positions, said spring means being yieldable upon operation of said motor means to permit rotation of said stem by said motor means but of sufficient strength to return said stem to said other of said angular positions when said motor means is de-energized.

2. A motor-driven valve comprising: a valve body having a flow passage therethrough and a valve seat in said passage; an operator stem rotatably mounted in said valve body and extending from the exterior of said body into said passage; a substantially U-shaped yoke member having a pair of leg portions; means rigidly attaching said yoke member to said stem in said cavity with said leg portions extending generally radially therefrom; a spherical valve closure member cooperable with said valve seat to control fluid flow therethrough, said closure member having a generally cylindrical opening extending diametrically therethrough; a generally cylindrical pin extending through the opening in said closure member and affixed at either side of said closure member to the free ends of said leg portions and thereby mounting said closure member between the leg portions of said yoke member, said operator stem being rotatable between first and second angular positions to selectively position said closure member with respect to said seat, the cylindrical opening through said closure member having a diameter sufficiently greater than the diameter of said pin to permit limited transverse movement therebetween and to render said closure member freely rotatable about said pin and the distance between said leg portions being sufficiently greater than the diameter of said closure member to permit limited axial movement of said closure member on said pin, the limited axial and transverse movement of said closure member with respect to said pin and yoke member rendering said closure member self-seating when said closure member is moved into engagement wtih the valve seat; electrically energizable motor means; means mounting said motor means on said body; means operably connecting said motor means to said stem so that when said motor means is energized it drives said stem to said first angular position; and spring return means operably connected to said stem and adapted to rotate said stem to said second angular position when said motor means is de-energized, said spring means including a first spring urging said stem toward said first angular position and which is substantially relaxed when said stem is in said first angular position, and a second spring urging said stem toward said second angular position and which is relatively highly stressed when said stem is in said first angular position, said second spring being sufficiently stronger than said first spring so that it rotates said stem toward said second angular position in opposition to said first spring when said motor means is de-energized, said first and second springs being chosen so that they balance each other when said stem reaches said second angular position.

3. A motor-driven valve comprising: a body having a generally symmetrical cavity therein; inlet and outlet ports connected to said cavity and substantially aligned on opposite sides of said body; a cover plate adapted to be mounted on said body to cover said cavity; symmetrical mounting means attaching said cover plate to said valve body so that said cover plate can be selectively mounted in either of two diametrically opposed angular positions with respect to said body; an operating stem rotatably mounted in said cover plate so that one end of said stem extends into said cavity at a point equidistance from said ports when said cover plate is mounted in either of said angular positions and so that said stem is offset a predetermined distance to one side of an axis through said ports when said cover plate is mounted in one of said angular positions and is offset a like predetermined angular distance to the other side of said axis when said cover plate is mounted in the other of said angular positions; a valve closure member mounted on said stem in said cavity and movable by said stem through an arc between a closed position wherein said closure member engages one of said ports and an open position wherein said closure member is positioned intermediate said ports, said closure member, when in said closed position, engaging said inlet port when said cover plate is mounted in one of said angular positions and engaging said outlet port when said cover plate is mounted in the other of said angular positions; motor means mounted on said cover plate; means operably connecting said motor means to said operating stem, said motor means being operable to rotatably drive said stem and thereby said closure member to one of its said angular positions; and spring means operably connected to said stem and urging said stem and thereby said closure member to the other of its said angular positions, said spring means being yieldable upon operation of said motor means to permit rotation of said stem by said motor means but of sufficient strength to return said stem to said other of its angular positions upon cessation of operation of said motor means.

4. A motor-driven valve comprising: a body having a generally symmetrical cavity therein; inlet and outlet ports connected to said cavity and substantially aligned on opposite sides of said body; a cover plate adapted to be mounted on said body to cover said cavity; symmetrical mounting means attaching said cover plate to said valve body so that said cover plate can be selectively mounted in either of two diametrically opposed angular positions with respect to said body; an operating stem rotatably mounted in said cover plate so that one end of said stem extends into said cavity at a point equidistance from said ports when said cover plate is mounted in either of said angular positions and so that said stem is offset a predetermined distance to one side of an axis through said ports when said cover plate is mounted in one of said angular positions and is offset a like predetermined angular distance to the other side of said axis when said cover plate is mounted in the other of said angular positions; a substantially U-shaped yoke member having a pair of spaced leg portions; means rigidly attaching said yoke member to said stem in said cavity with said leg portions extending generally radially therefrom; a spherical valve closure member cooperable with said ports to control fluid flow therethrough, said closure member having a generally cylindrical opening extending diametrically therethrough; a generally cylindrical pin extending through the opening in said closure member and affixed at either side of said closure member to the free ends of said leg portions and thereby mounting said closure member between the leg portions of said yoke member with said pin extending generally parallel to said stem, said closure member being movable by said stem through an arc between a closed position wherein said closure member engages one of said ports and an open position wherein said closure member is positioned intermediate said ports, said closure member, when in said closed position, engaging said inlet port when said cover plate is mounted in one of said angular positions and engaging said outlet port when said cover plate is mounted in the other of said angular positions, the cylindrical opening through said closure member having a diameter sufficiently greater than the diameter of said pin to permit limited transverse movement therebetween and to render said closure member freely rotatable about said pin and the distance between said leg portions being sufficiently greater than the diameter of said closure member to permit limited axial movement of said closure member on said pin, the limited axial and transverse movement of said closure member with respect to said pin and yoke member rendering said closure member self-seating when said closure member is moved into engagement with one of said ports; electrically energizable motor means mounted on said cover plate; means operably connecting said motor means to said operating stem, said motor means being operable to rotatably drive said stem and thereby said closure member to one of its said angular positions; and spring means operably connected to said stem and urging said stem and thereby said closure member to the other of its said angular positions, said spring means being yieldable upon operation of said motor means to permit rotation of said stem by said motor means but of sufficient strength to return said stem to said other of its angular positions upon de-energization of said motor means.

5. A motor-driven valve comprising: a body having a generally symmetrical cavity therein; inlet and outlet ports connected to said cavity and substantially aligned on opposite sides of said body; a cover plate adapted to be mounted on said body to cover said cavity; symmetrical mounting means attaching said cover plate to said valve body so that said cover plate can be selectively mounted in either of two diametrically opposed angular positions with respect to said body; an operating stem rotatably mounted in said cover plate so that one end of said stem extends into said cavity at a point equidistant from said ports when said cover plate is mounted in either of said angular positions and so that said stem is offset a predetermined distance to one side of an axis through said ports when said cover plate is mounted in one of said angular positions and is offset a like predetermined angular distance to the other side of said axis when said cover plate is mounted in the other of said angular positions; a substantially U-shaped yoke member having a pair of leg portions; means rigidly attaching said yoke member to said stem in said cavity with said leg portions extending generally radially therefrom; a spherical valve closure member cooperable with said ports to control fluid flow therethrough, said closure member having a generally cylindrical opening extending diametrically therethrough; a generally cylindrical pin extending through the opening in said closure member and affixed at either side of said closure member to the free ends of said leg portions and thereby mounting said closure member between the leg portions of said yoke member with said pin extending generally parallel to said stem, said closure member being movable by said stem through an arc between a closed position wherein said closure member engages one of said ports and an open position wherein said closure member is positioned intermediate said ports, said closure member, when in said closed position, engaging said inlet port when said cover plate is mounted in one of said angular positions and engaging said outlet port when said cover plate is mounted in the other of said angular positions, the cylindrical opening through said closure member having a diameter sufficiently greater than the diameter of said pin to permit limited transverse movement therebetween and to render said closure member freely rotatable about said pin and the distance between said leg portions being sufficiently greater than the diameter of said closure member to permit limited axial movement of said closure member on said pin, the limited axial and transverse movement of said closure member with respect to said pin and yoke member rendering said closure member self-seating when said closure member is moved into engagement with one of said ports; electrically energizable motor means of the type which can be stalled without damage thereto; means mounting said motor means on said cover plate; means operably connecting said motor means to said operating stem, said motor means being adapted, when energized, to rotatably drive said stem and thereby said closure member to one of its said angular positions and to stall in the position as long as said motor means is energized; and spring means operably connected to said stem and urging said stem and thereby said closure member to the other of its said angular positions, said spring means including a first spring urging said stem toward said first angular position and which is substantially relaxed when said stem is in said first angular position, and a second spring urging said stem toward said second angular position and which is relatively highly stressed when said stem is in said first angular position, said second spring being sufficiently stronger than said first spring so that it rotates said stem toward said second angular position in opposition to said first spring when said motor means is deenergized, and said first and second springs being chosen so that they balance each other when said stem reaches said second angular position.

6. A motor driven valve comprising: a body having a plurality of walls surrounding a cavity therein, said body having first and second ports connected to said cavity and substantially aligned in opposite walls of said body, said body further having another of its said walls adapted to have an additional port therein to convert said valve for 3-way operation; a cover plate adapted to be mounted on said body to cover said cavity; mounting means attaching said cover plate to said valve body; an operating stem rotatably mounted in said cover plate so that one end of said stem extends into said cavity at a point equidistance from said first and second ports and so that said stem is offset a predetermined distance to one side of an axis through said first and second ports when said cover plate is mounted on said body, the other end of said stem extending outward from said cover plate; a symmetrical closure member mounted on said stem in said cavity and cooperable with said first and second ports, said closure member being movable by said stem through an arc defined by end positions wherein said closure member is seated on said first and second ports respectively; electrically energizable motor means of the type which can be stalled without damage thereto, said motor means having an output pinion; means mounting said motor means on said cover plate and in spaced relationship therewith; a symmetrical connecting member non-rotatably connected at its center to said stem intermediate said cover plate and said motor means; a gear sector having an aperture concentric with its center of curvature and adapted to receive said connecting member therein, said connecting member and the aperture in said gear sector having mating geometric configurations rendering said connecting member and said sector relatively non-rotatable when assembled but capable of being selectively assembled in a plurality of relative angular positions, said sector, when mounted on said connecting member, meshing with the output pinion of said motor means; said motor means thereby being adapted, when energized, to drive said stem and thereby said closure member in one angular direction; spring means operably connected to said stem and urging said stem and thereby said closure member in the other angular direction, said spring means being yieldable upon operation of said motor means to permit rotation of said stem by said motor means but of sufficient strength to return said stem upon de-energization of said motor means; stop means adapted to operably engage said sector member when said sector member is in a predetermined angular position; indicia means on said connector member; first indicia means on said gear sector and alignable with the indicia means on said connector member to define an angular relationship between said connector member and said gear sector so that said spring means urges said closure member into engagement with said first port and said motor means is operable to drive said closure member to an open position intermediate said ports and wherein said sector operably engages said first stop means; second indicia means on said sector member and alignable with the indicia means on said connector member to define an angular position between said sector and said connector member wherein, in the absence of said stop means, said spring means urges said closure member to an open position intermediate said ports and said motor means is operable to drive said closure member into engagement with said second port; and third indicia means on said sector; intermediate said first and second indicia means thereon, and alignable with the indicia means on said connector member to define an angular position between said sector and said connector member wherein, in the absence of said stop means, said spring means urges said closure member into engagement with said first port and said motor means is operable to drive said closure member into engagement with said second port.

7. A motor driven valve comprising: a body having a plurality of walls surrounding a cavity therein, said body having first and second ports connected to said cavity and substantially aligned in opposite walls of said body, said body further having another of its said walls adapted to have an additional port therein to convert said valve for 3-way operation; a cover plate adapted to be mounted on said body to cover said cavity; mounting means attaching said cover plate to said valve body; an operating stem rotatably mounted in said cover plate so that one end of said stem extends into said cavity at a point equidistance from said first and second ports and so that said stem is offset a predetermined distance to one side of an axis through said first and second ports when said cover plate is mounted on said body, the other end of said stem extending outward from said cover plate; a substantially U-shaped yoke member having a pair of spaced leg portions; means rigidly attaching said yoke member to said stem in said cavity with said leg portions expanding generally radially therefrom; a spherical valve closure member adapted to cooperate with either of said first and second ports, said closure member having a generally cylindrical opening extending diametrically therethrough; a generally cylindrical pin extending through the opening in said closure member and affixed at either side of said closure member to the free ends of said leg portions and thereby mounting said closure member between the leg portions of said yoke member, said closure member being movable by said stem through an arc defined by end positions wherein said closure member is seated on said first and second ports respectively; the cylindrical opening through said closure member having a diameter sufficiently greater than the diameter of said pin to facilitate limited transverse movement therebetween and to render said closure member freely rotatable about said pin and the distance between said leg portions being sufficiently greater than the diameter of said closure member to permit limited axial movement of said closure member on said pin, the limited axial and transverse movement of said closure member with respect to said pin and yoke member rendering said closure member self-seating when said closure member is moved into engagement with either of said ports; electrically energizable motor means of the type which can be stalled without damage thereto, said motor means having an output pinion; means mounting said motor means on said cover plate and in spaced relationship therewith; a symmetrical connecting member non-rotatably connected at its center to said stem intermediate said cover plate and said motor means; a gear sector having an aperture concentric with its center of curvature and adapted to receive said connecting member therein, said connecting member and the aperture in said gear sector having mating geometric configurations rendering said connecting member and said sector relatively non-rotatable when assembled but capable of being selectively assembled in a plurality of relative angular positions, said sector, when mounted on said connecting member, meshing with the output pinion of said motor means, said motor means thereby being adapted, when energized, to drive said stem and thereby said closure member in one angular direction; spring means operably connected to said stem and urging said stem and thereby said closure member in the other angular direction, said spring means being yieldable upon operation of said motor means to permit rotation of said stem by said motor means but of sufficient strength to return said stem upon de-energization of said motor means; stop means adapted to operably engage said sector member when said sector member is in a predetermined angular position; indicia means on said connector member; first indicia means on said gear sector and alignable with the indicia means on said connector member to define an angular relationship between said connector member and said gear sector so that said spring means urges said closure member into engagement with said first port and said motor means is operable to drive said closure member to an open position intermediate said ports at which position said sector operably engages said first stop means; second indicia means on said sector member and alignable with the indicia means on said connector member to define an angular position between said sector and said connector member wherein, in the absence of said stop means, said spring means urges said closure member to an open position intermediate said ports and said motor means is operable to drive said closure member into engagement with said second port; and third indicia means on said sector, intermediate said first and second indicia means thereon, and alignable with the indicia means on said connector member to define an angular position between said sector and said connector member wherein, in the absence of said stop means, said spring means urges said closure member into engagement with said first port and said motor means is operable to drive said closure member into engagement with said second port.

8. A motor driven valve comprising: a body having a plurality of walls surrounding a generally symmetrical cavity therein, said body having first and second ports connected to said cavity and substantially aligned in opposite wals of said body, said body further having another of its said walls adapted to have an additional port therein to convert said valve for 3-way operation; a cover plate adapted to be mounted on said body to cover said cavity; symmetrical mounting means attaching said cover plate to said valve body so that said cover plate can be selectively mounted in either of two diametrically opposed angular positions with respect to said body; an operating stem rotatably mounted in said cover plate so that one end of said stem extends into said cavity at a point equidistance from said ports when said cover plate is mounted in either of said angular positions and so that said stem is offset a predetermined distance to one side of an axis through said ports when said cover plate is mounted in one of said angular positions and is offset a like predetermined distance to the other side of said axis when said cover plate is mounted in the other of said angular positions, the other end of said stem extending outward from said cover plate; a symmetrical closure member mounted on said stem in said cavity and cooperable with said first and second ports, said closure member being movable by said stem through an arc defined by end positions wherein said closure member is seated on said first and second ports respectively; electrically energizable motor means of the type which can be stalled without damage thereto, said motor means having an output pinion; means mounting said motor means on said cover plate and in spaced relationship therewith; a symmetrical connecting member non-rotatably connected at its center on said operating stem intermediate said cover plate and said motor means; a gear sector having an aperture concentric with its center of curvature and adapted to receive said connecting member therein, said connecting member and the aperture in said gear sector having mating geometric configurations rendering said connecting member and said sector relatively non-rotatable when assembled but capable of being selectively assembled in a plurality of relative angular positions, said sector, when mounted on said connecting member, meshing with the output pinion of said motor means, said motor means thereby being adapted, when energized to drive said stem and thereby said closure member in one angular direction; spring means operably connected to said stem and urging said stem and thereby said closure member in the other angular direction, said spring means being yieldable upon operation of said motor means to permit rotation of said stem by said motor means but of sufficient strength to return said stem upon de-energization of said motor means; first stop means adapted to operably engage said sector member when said sector member is in a first angular position; second stop means adapted to operably engage said sector member when said sector member is in a second angular position; indicia means on said connector member; first indicia means on said gear sector and alignable with the indicia means on said connector member to define an angular relationship between said connector member and said gear sector wherein, when said cover plate is mounted in either of its angular positions on said body, said motor means, when energized, drives said sector into engagement with said first stop means so that said motor means stalls in a position wherein said closure member is positioned intermediate said first and second ports, and so that, when said cover plate is mounted in a first of its angular positions on said body, said spring means urges said closure member into engagement with said first port and so that when said cover plate is mounted in the second of its said angular positions on said body, said spring means urges said closure member into engagement with said second port; second indicia means on said sector member and alignable with the indicia means on said connector member to define a second angular position between said sector and said connector member wherein, with said cover plate in either of its said angular positions, said spring means urges said sector into operative engagement with said second stop means to position said closure member intermediate said first and second ports, and so that, in the absence of said first stop means, said motor means is operable to drive said closure member into engagement with said second port when said cover plate is in its first angular position and so that said motor means is operable to drive said closure member into engagement with said first port when said cover plate is in its second angular position; and third indicia means on said sector, intermediate said first and second indicia means thereon, and alignable with the indicia means on said connector member to define an angular position between said sector and said connector member wherein, in the absence of said first stop means, said spring means urges said closure member into engagement with said first port and said motor means is operable to drive said closure member into engagement with said second port when said cover plate is mounted in its first angular position, and so that said spring means urges said closure member into engagement with said second port and said motor means is operable to drive said closure member into engagement with said first port when said cover plate is mounted in its second angular position.

9. A motor driven valve comprising: a body having a plurality of walls surrounding a cavity therein, said body having first and second ports connected to said cavity and substantially aligned in opposite walls of said body, a cover plate mounted on said body to cover said cavity; an operating stem rotatably mounted in said cover plate so that one end of said stem extends into said cavity at a point substantially equidistance from said ports, the other end of said stem extending outward from said cover plate; a symmetrical closure member mounted on said stem in said cavity and cooperable with said first and second ports said closure member being movable by said stem through an arc defined by end positions wherein said closure member is seated on said first and second ports respectively; electrically energizable motor means of the type which can be stalled without damage thereto, said motor means having an output pinion; means mounting said motor means on said cover plate and in spaced relationship therewith; a connecting member non-rotatably mounted on said stem intermediate said cover plate and said motor means; a gear sector having an aperture concentric with its center of curvature and adapted to receive said connecting member therein, said connecting member and the aperture in said gear sector having mating geometric configurations rendering said connecting member and said sector relatively non-rotatable when assembled but capable of being selectively assembled in a plurality of relative angular positions, said sector, when mounted on said connecting member, meshing with the output pinion of said motor means, said motor means thereby being adapted, when energized, to drive said stem and thereby said closure member in one angular direction; spring means operably connected to said stem and urging said stem and thereby said closure member in the other angular direction, said spring means being yieldable upon operation of said motor means to permit rotation of said stem by said motor means but of sufficient strength to return said stem upon de-energization of said motor means; first stop means adapted to operably engage said sector member when said sector member is in a first angular position; second stop means adapted to operably engage said sector member when said sector member is in a second angular position; indicia means on said connector member; first indicia means on said gear sector and alignable with the indicia means on said connector member to define an angular relationship between said connector member and said gear sector wherein said motor means, when energized, drives said sector into engagement with said first stop means so that said motor means stalls in a position wherein said closure member is positioned intermediate said first and second ports, and so that said spring means urges said closure member into engagement with said first port; and second indicia means on said sector member and alignable with the indicia means on said connector member to define a second angular position between said sector and said connector member wherein said spring means urges said sector into operative engagement with said second stop means to position said closure member intermediate said first and second ports, and so that, in the absence of said first stop means, said motor means is operable to drive said closure member into engagement with said second port.

10. A motor driven valve comprising: a body having a plurality of walls surrounding a generally symmetrical cavity therein, said body having a port in one of said walls and connected to said cavity; a cover plate adapted to be mounted on said body to cover said cavity; symmetrical mounting means attaching said cover plate to said valve body so that said cover plate can be selectively mounted in either of two diametrically opposed angular positions with respect to said body; an operating stem rotatably mounted in said cover plate so that one end of said stem extends into said cavity at a point equidistance from said port when said cover plate is mounted in either of said angular positions and so that said stem is offset a predetermined distance to one side of an axis through said port when said cover plate is mounted in one of said angular positions and is offset a like predetermined angular distance to the other side of said axis when said cover plate is mounted in the other of said angular positions, the other end of said stem extending outward from said cover plate; a symmetrical valve closure member mounted on said stem and adapted to cooperate with said port when said cover plate is mounted in either of its angular positions on said body, said closure member being movable by said stem through an arc between an open position and a closed position wherein said closure member is seated against said port; electrically energizable motor means of the type which can be stalled without damage thereto, said motor means having an output pinion; means mounting said motor means on said cover plate and in spaced relationship therewith; a symmetrical connecting member non-rotatably connected at its center to said stem intermediate said cover plate and said motor means; a gear sector having an aperture concentric with its center of curvature and adapted to receive said connecting member therein, said connecting member and the aperture in said gear sector having mating geometric configurations rendering said connecting member and said sector relatively non-rotatable when assembled but capable of being selectively assembled in at least two relative angular positions, said sector, when mounted on said connecting member, meshing with the output pinion of said motor means, said motor means thereby being adapted, when energized, to drive said stem and thereby said closure member in one angular direction; spring means operably connected to said stem and urging said stem and thereby said closure member in the other angular direction, said spring means being yieldable upon operation of said motor means to permit rotation of said stem by said motor means but of sufficient strength to return said stem upon de-energization of said motor means; first stop means adapted to operably engage said sector member when said sector member is in a first angular position; and second stop means adapted to operably engage said sector member when said sector member is in a second angular position, said gear sector and said connector member, when assembled in one of said relative angular positions, defining an angular relationship therebetween wherein, when said cover plate is mounted in one of its angular positions on said body, said spring means urges said closure member against said port and said motor means is operable to drive said sector into engagement with said first stop means so that said motor means stalls in a position wherein said closure member is disposed in an open position, and said sector member and said connector member, when assembled in another of said relative angular positions, defining an angular relationship therebetween wherein, with said cover plate in the other of its said angular positions, said spring means urges said sector into operative engagement with said second stop means to position said closure member in an open position away from said port and so that, in the absence of said first stop means, said motor means is operable to drive said closure member into engagement with said port.

References Cited by the Examiner

UNITED STATES PATENTS

| | | | |
|---|---|---|---|
| 414,509 | 11/1889 | Fisher | 251—88 |
| 1,171,189 | 2/1916 | Grandi | 251—298 |
| 1,778,669 | 10/1930 | Graham | 251—226 X |
| 2,855,950 | 10/1958 | Phillips | 137—505.28 |
| 3,155,855 | 11/1964 | Futterer. | |
| 3,176,720 | 4/1965 | Donahue | 251—133 X |

FOREIGN PATENTS 733,417   3/1943   Germany.

M. CARY NELSON, *Primary Examiner.*

M. SCHWADRON, *Assistant Examiner.*